March 8, 1932.  W. B. FLANDERS  1,848,613
LABYRINTH PACKING
Filed April 20, 1929

WITNESS
E. Lutz

INVENTOR
W. B. FLANDERS.
BY
a. B. Reavis
ATTORNEY

Patented Mar. 8, 1932

1,848,613

UNITED STATES PATENT OFFICE

WARREN B. FLANDERS, OF PHILADELPHIA, PENNSYLVANIA, ASSIGNOR TO WESTINGHOUSE ELECTRIC & MANUFACTURING COMPANY, A CORPORATION OF PENNSYLVANIA

LABYRINTH PACKING

Application filed April 20, 1929. Serial No. 356,669.

My invention relates to labyrinth packing for sealing the space between two relatively rotatable members, and it has for its object to provide a construction of labyrinth packing which permits a greater relative axial movement of said members during which the packing is effective, without increasing the axial extent of the packing or reducing the number of packing clearances.

According to one type of labyrinth packing heretofore used, annular packing elements having peripheral packing surfaces are provided on one of the members, and the other member carries packing elements having sharp edges packing against the peripheral surfaces of the first packing elements. In order to permit axial expansion of the first-mentioned elements and radiation of heat therefrom upon heating due to accidental contact, narrow annular recesses are provided between the adjacent packing elements.

When the packing is applied to a machine subjected to temperature changes, such as a steam turbine, the packing elements must be effective for an extent of axial movement between the members. It will be apparent that this packing is effective for the extent of the peripheral packing surfaces. However, should the relative movement exceed this extent, the sharp edged packing elements would be disposed opposite said annular recesses, and the effectiveness of the packing would be greatly reduced, or practically destroyed.

In accordance with my invention, I increase the extent of effectiveness of the packing by increasing the width of the first-mentioned packing elements at the peripheral marginal portion, so that the recesses are axially overlapped by the widened peripheral packing surfaces of the adjacent packing elements. The packing elements are preferably of alternately greater and lesser height, so that the widened peripheral portions are offset radially and do not close the recesses.

The above and other objects are effected by my invention, as will be apparent from the following description and claims taken in connection with the accompanying drawings, forming a part of this application, in which:

Figure 1:
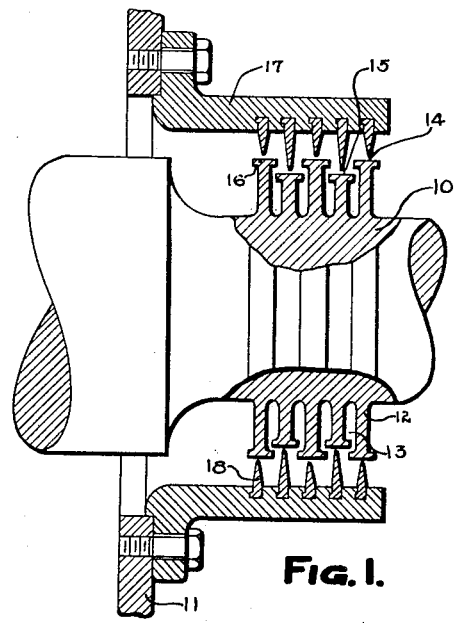
Fig. 1 is a sectional view of the packing.

Referring now to the drawings more in detail, I show my packing applied to a rotating shaft 10 extending through a housing 11. The shaft and housing may be part of any fluid machine, for example, a steam turbine.

The shaft is formed with a row of annular radially-extending packing elements 12. These elements are spaced by slots 13 therebetween, and are of alternately greater and lesser height as indicated at 14 and 15, respectively.

The heads or peripheral portions of the elements are widened, by the provision of lateral projections 16, in order to provide increased axial extent of the peripheral surfaces. Each projection 16 extends approximately half way across the slot 13; thus the greatest possible axial extent of peripheral packing surface is obtained.

An annular packing member 17, encircling the packing elements 12, is bolted or otherwise attached to the housing 11. The member 17 has secured thereto packing elements 18 which extend radially inwardly and have thin edges cooperating with the peripheral surfaces of the packing elements 12 to form close packing clearances.

In some machines with which such a packing may be employed, for example, a steam turbine, some relative axial movement is encountered at the packing due to unequal temperature conditions in the turbine. The present packing is effective for an axial extent equal to the width of the heads of the packing elements 12, which may, as will be apparent from the drawings, readily be considerably greater than the width of the body proper of the packing elements.

The thin edges of the projections 16, formed by widening the peripheries of the packing elements 14, serve an important purpose. Upon excessive axial movement of the rotor, due to wear of the thrust bearing or other cause, the thin edges of these projections contact with the sides of the packing elements 18, making a squealing noise which warns the operator. As the edges are thin, no damage results, other than slight wear of the edges.

Figure 2:
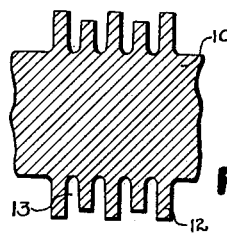
Figs. 2 to 5 are sectional views showing the member having the novel packing elements in successive stages of manufacture.
Figure 3:
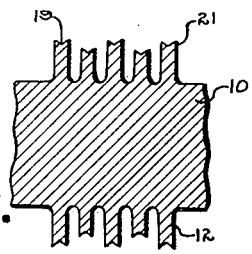

The packing elements 12 shown in Fig. 1 may be made by the method illustrated in Figs. 2 to 5. The shaft 10 is first machined by cutting the slots 13, which forms the elements 12. The peripheries of the elements 12 are turned, alternate elements being formed with peripheries disposed radially inwardly of the intermediate elements, as shown in Fig. 2. The peripheries of all the elements 12 are then grooved, as shown at 19 in Fig. 3, forming projections 21.

Figure 4:
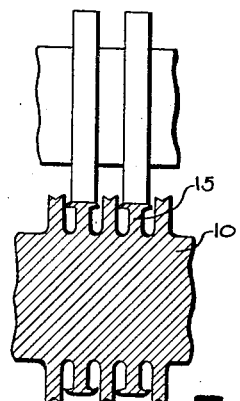

The packing elements 15, of lesser height, are then rolled to spread the projections 21 and to form wide, substantially cylindrical peripheral surfaces. The rolling may be done in one or more steps. Fig. 4 shows the rolling operation at completion.

The edges of the projections 21 curve inwardly in this operation as shown in Fig. 4. The curved edges are then cut off approximately midway between the adjacent packing elements, thus forming the thin-edged projections 16 of Fig. 1. The elements 15, after completion of this operation, are shown in Fig. 5.

Figure 5:
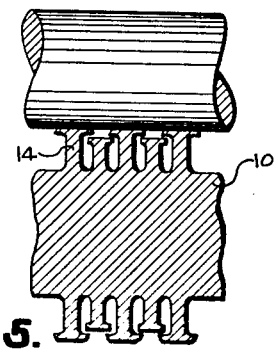

The intermediate elements 14 of greater height are then similarly rolled as shown in Fig. 5. The curved edges of the projections 21 are also cut midway between the adjacent packing elements to complete the packing elements on the shaft.

From the above description it will be seen that I have increased the extent of effectiveness of packing of this type.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A labyrinth packing structure comprising two relatively rotatable members, one of said members having a row of spaced annular radially-extending packing elements of alternately greater and lesser height, said elements being formed with widened heads having substantially cylindrical peripheral surfaces, said peripheral surfaces of the elements of lesser height extending substantially the full axial extent between the peripheral surfaces of the elements of greater height, and the other member carrying packing elements having thin edges cooperating with the peripheral surfaces of the first-mentioned packing elements to provide close packing clearances.

2. A labyrinth packing structure comprising two relatively rotatable members, one of said members having a row of spaced annular radially-extending packing elements of alternately greater and lesser height, said elements being formed with widened heads having substantially cylindrical peripheral surfaces, and the other member carrying packing elements extending radially inwardly and having thin edges cooperating with the peripheral surfaces of the first-mentioned packing elements to provide close packing clearances, the widened heads of said packing elements of greater height having axially-extending thin edges adapted to contact with the packing elements carried by said other member and cooperating with the packing elements of lesser height, upon excessive relative axial movement of the members.

3. A labyrinth packing structure comprising two relatively rotatable members, one of said members having a row of spaced annular radially-extending packing elements of alternately greater and lesser height, said elements being formed with widened heads having peripheral packing surfaces substantially wider than the body of the packing element, and the other member carrying packing elements having thin edges cooperating with the wide peripheral packing surfaces of the first-mentioned packing elements to provide close packing clearances.

In testimony whereof I have hereunto subscribed my name this 16th day of April, 1929.

WARREN B. FLANDERS.